(12) United States Patent
Yee

(10) Patent No.: US 7,086,245 B2
(45) Date of Patent: Aug. 8, 2006

(54) VALVE APPARATUS FOR CONTROLLING MASS FLOW, MANUFACTURING METHOD THEREOF AND HEAT EXCHANGER USING THE SAME

(75) Inventor: Young Joo Yee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 10/828,212

(22) Filed: Apr. 21, 2004

(65) Prior Publication Data
US 2004/0222395 A1 Nov. 11, 2004

(30) Foreign Application Priority Data
Apr. 21, 2003 (KR) .................. 10-2003-0025004

(51) Int. Cl.
F25B 41/04 (2006.01)
F16K 31/02 (2006.01)
(52) U.S. Cl. .................. 62/222; 236/92 B; 251/65; 251/129.02; 251/129.15; 251/129.21
(58) Field of Classification Search .................. 62/222; 236/92 B; 251/65, 129.01, 129.15, 129.21, 251/129.02
See application file for complete search history.

(56) References Cited
U.S. PATENT DOCUMENTS
4,564,046 A * 1/1986 Lungu .................. 137/625.65
4,690,371 A 9/1987 Bosley et al.
4,744,543 A 5/1988 Renheim
5,529,281 A * 6/1996 Brudnicki et al. ..... 251/129.03
5,863,024 A 1/1999 Blind et al.
6,880,564 B1 * 4/2005 Erickson .................. 137/1

FOREIGN PATENT DOCUMENTS
DE 20203342 8/2002

* cited by examiner

Primary Examiner—Marc E. Norman
(74) Attorney, Agent, or Firm—Birch, Stewart, Kolasch, & Birch, LLP

(57) ABSTRACT

A flow control valve apparatus, a manufacturing method thereof and a heat exchanger using the same. The flow control valve apparatus includes: a flow channel having a longitudinal axis comprised of an upper flow channel and a lower flow channel, for guiding a fluid; sealing means installed in a plane perpendicular to the flow channel and having an orifice through which the fluid passes; opening/closing means for controlling opening/closing of the orifice; and applying means installed along an outer circumference of the flow channel and to which a current may be applied for controlling the opening/closing of the orifice. According to the inventive flow control valve apparatus, the displacement of the permanent magnet valve member is varied using the current applied to the solenoid coil, thereby linearly controlling the opened area of the orifice and/or performing the opening/closing operation of the orifice. The valve apparatus can be miniaturized at a low price. By applying the valve apparatus to a heat exchanger, its cooling efficiency can be controlled easily.

22 Claims, 12 Drawing Sheets

VALVE APPARATUS FOR CONTROLLING MASS FLOW, MANUFACTURING METHOD THEREOF AND HEAT EXCHANGER USING THE SAME

This Nonprovisional application claims priority under 35 U.S.C. § 119(a) on Patent Application No. 25004/2003 filed in Korea on Apr. 21, 2003, the entire contents of which are hereby incorporated by reference.

BACKGROUND OF THE INVENTION

1. Field of the Invention

The present invention relates to a flow control valve apparatus, and more particularly, to a flow control valve apparatus that can control flow depending on a linear displacement of a permanent magnet valve lid using a current manufacturing method thereof, and a heat exchanger using the same.

2. Description of the Related Art

Because the flow control valve apparatus for controlling flow flowing through a flow channel is applicable to many industrial fields (ex. refrigerator, etc.), research on the flow control valve apparatus has recently been actively performed.

In general, a flow control valve apparatus controls flow by moving a pin shaped valve rod from an orifice by a predetermined distance to linearly control the opened area of the orifice. In other words, in the related art flow control valve apparatus, a valve rod is connected to a gear connected to a rotor shaft of a stepping motor, and the displacement of the valve rod can be varied in proportion to the number of pulses of the driving power.

However, such a flow control valve apparatus has a high production cost due to the high price of stepping motors and has a difficulty in achieving hermetic sealing between the rotor shaft of the stepping motor and the flow channel where the valve rod is positioned.

Another flow control valve apparatus has a diaphragm or a membrane installed in a part of the valve rod, provides a compressive space on a rear surface of the diaphragm or the membrane, and deforms the diaphragm using an expansion pressure due to heating of a fluid filled in the compressive space, thereby controlling the displacement of the valve rod. However, this flow control valve apparatus is difficult to miniaturize due to an addition of the separate compressive space, and a valve response speed for a linear operation is reduced by using an expansion pressure due to the heating of the compressive space, so that power consumption is increased due to heat radiation.

The flow control valve using a solenoid coil has difficulty providing linear control of the fluid owing to the instable valve rod, and has problems of complicated parts and serious noise occurrence during the opening and closing operation thereof.

SUMMARY OF THE INVENTION

Accordingly, the present invention is directed to a flow control valve apparatus, manufacturing method thereof, and heat exchanger using the same, that substantially obviates one or more problems due to limitations and disadvantages of the related art.

An object of the present invention is to provide a flow control valve apparatus that can linearly and stably control an opened area of an orifice by controlling the amount of current applied to a coil.

Another object of the present invention is to provide a manufacturing method of a flow control valve apparatus in which a supporting means for supporting a permanent magnet valve member is mass-produced precisely at a low price so as to be applied to the flow control valve apparatus by using a semiconductor batch process and micromachining technology such that its constituent parts can be miniaturized and simplified.

A further object of the present invention is to provide a heat exchanger enabling easy control of cooling (or freezing) performance by employing the flow control valve apparatus as the linear expansion valve of the heat exchanger.

Additional advantages, objects, and features of the invention will be set forth in part in the description which follows and in part will become apparent to those having ordinary skill in the art upon examination of the following, or may be learned from practice, of the invention. The objectives and other advantages of the invention may be realized and attained by the structure particularly pointed out in the written description and claims hereof as well as the appended drawings.

To achieve this object and other advantages, and in accordance with the purpose of the invention, as embodied and broadly described herein, there is provided a flow control valve apparatus comprising: a flow channel comprising an upper flow channel and a lower flow channel, for guiding a fluid; sealing means installed perpendicular to the flow channel and having an orifice through which the fluid passes; opening/closing means for controlling the opening/closing of the orifice; and applying means installed along an outer circumference of the flow channel, to which a current for controlling the opening/closing of the orifice is applied.

The opening/closing means may include a permanent magnet valve member for opening/closing the orifice, and a supporting member for suspending the permanent magnet valve member.

According to another aspect of the present invention, there is provided a flow control valve apparatus comprising: a flow channel comprised of an upper flow channel and a lower flow channel, for guiding a fluid; a sealing piece installed perpendicular to the flow channel and having an orifice through which the fluid passes; a permanent magnet valve member for opening/closing the orifice; a supporting member for suspending the permanent magnet valve member; and a solenoid coil installed along an outer circumference of the flow channel, to which a current for linearly varying a displacement of the permanent magnet valve member is applied.

According to a further aspect of the present invention, there is provided a method for manufacturing a flow control valve apparatus, the method comprising: forming a supporting member comprised of a hub having a through-hole, an elastic flexure and a fixing part, by using an etch mask pattern patterned on upper and lower surfaces of a silicon substrate as an etch mask; inserting and fixing a permanent magnet valve member into the through-hole; bonding the supporting member to which the permanent magnet valve member is fixed on an inner circumference of a flow channel; and installing at least one solenoid coil along an outer circumference of the flow channel.

According to a further aspect of the present invention, there is provided a heat exchanger in which a refrigerant compressed in a compressor is liquefied in a condenser, injected into a valve, adiabatically expanded in the valve, vaporized and cooled in an evaporator, and the vaporized refrigerant is again injected into the compressor, thereby constituting a repetitive heat exchange cycle, wherein the valve comprises: a flow channel which allows the refrigerant liquefied in the condenser to adiabatically expand and output; a sealing piece installed perpendicular to the flow channel and having an orifice through which the fluid passes; a permanent magnet valve member for opening/closing the orifice; a supporting member for suspending the permanent magnet valve member; and a solenoid coil installed along an outer circumference of the flow channel, to which a current for linearly varying a displacement of the permanent magnet valve member is applied.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and, together with the description, serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
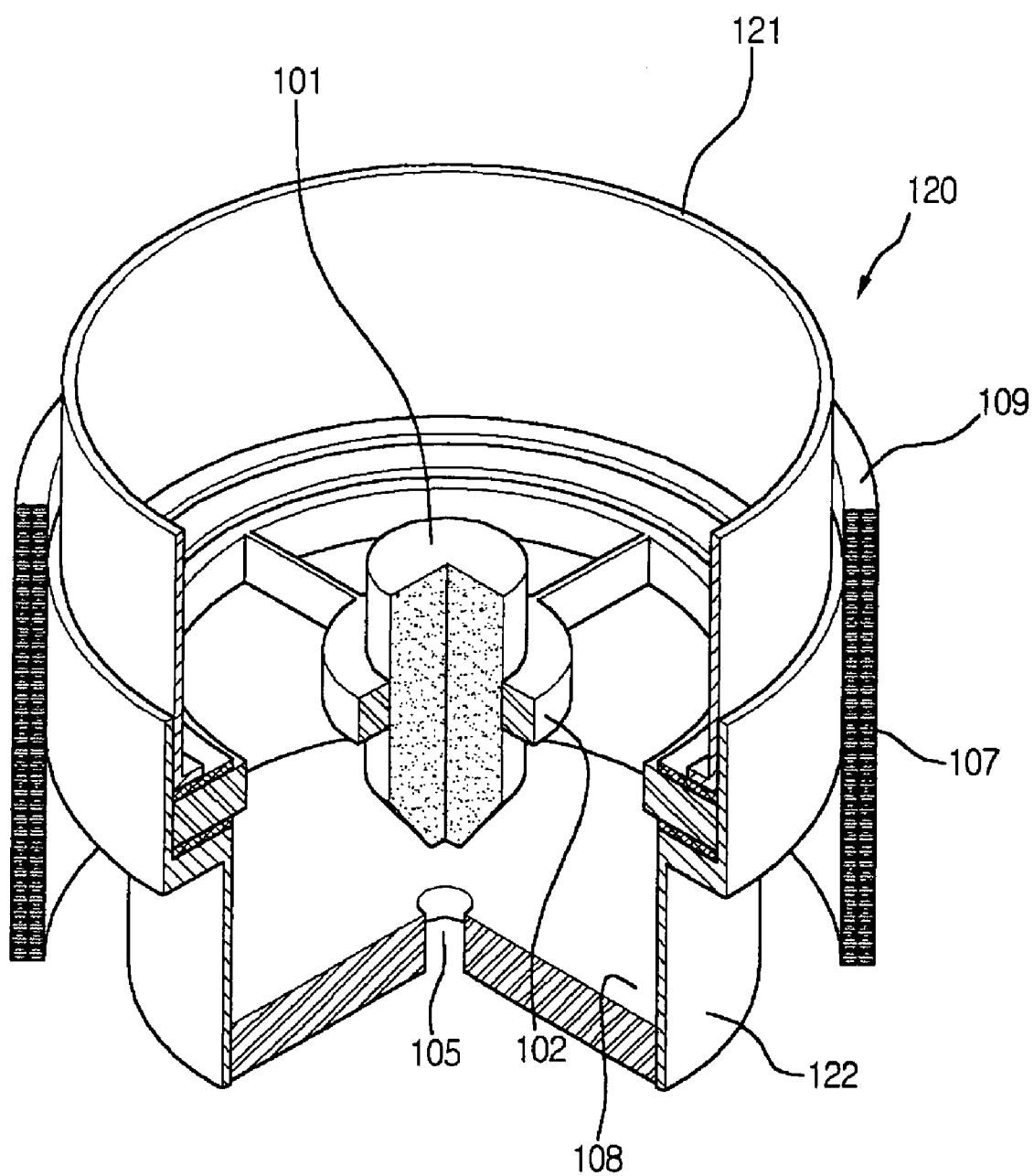
FIG. 1 is a perspective view of a cutaway portion of a flow control valve apparatus according to a preferred embodiment of the present invention.
Figure 2:
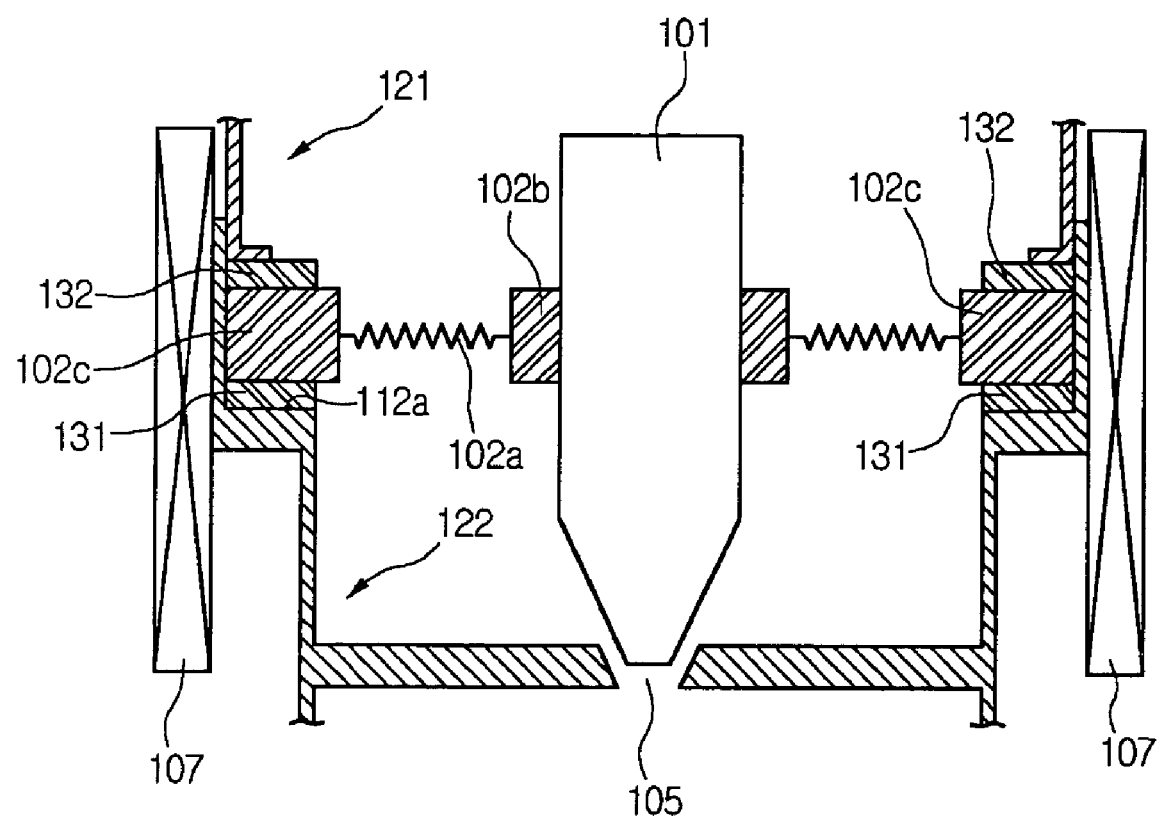
FIG. 2 is a schematic sectional view of the flow control valve apparatus shown in FIG. 1.

Referring to FIG. 1, an inventive flow control valve apparatus 100 is configured to include a flow channel 120 having a longitudinal axis for guiding fluid, a sealing piece 108 installed in a plane perpendicular to the longitudinal axis of the flow channel 120, and having an orifice 105 through which the fluid passes, a permanent magnet valve member 101 for opening/closing the orifice 105, a supporting member 102 for suspending the permanent magnet valve member 101, and a solenoid coil 107 to which a current for controlling displacement of the permanent magnet valve member 101 is applied.

Figure 3:
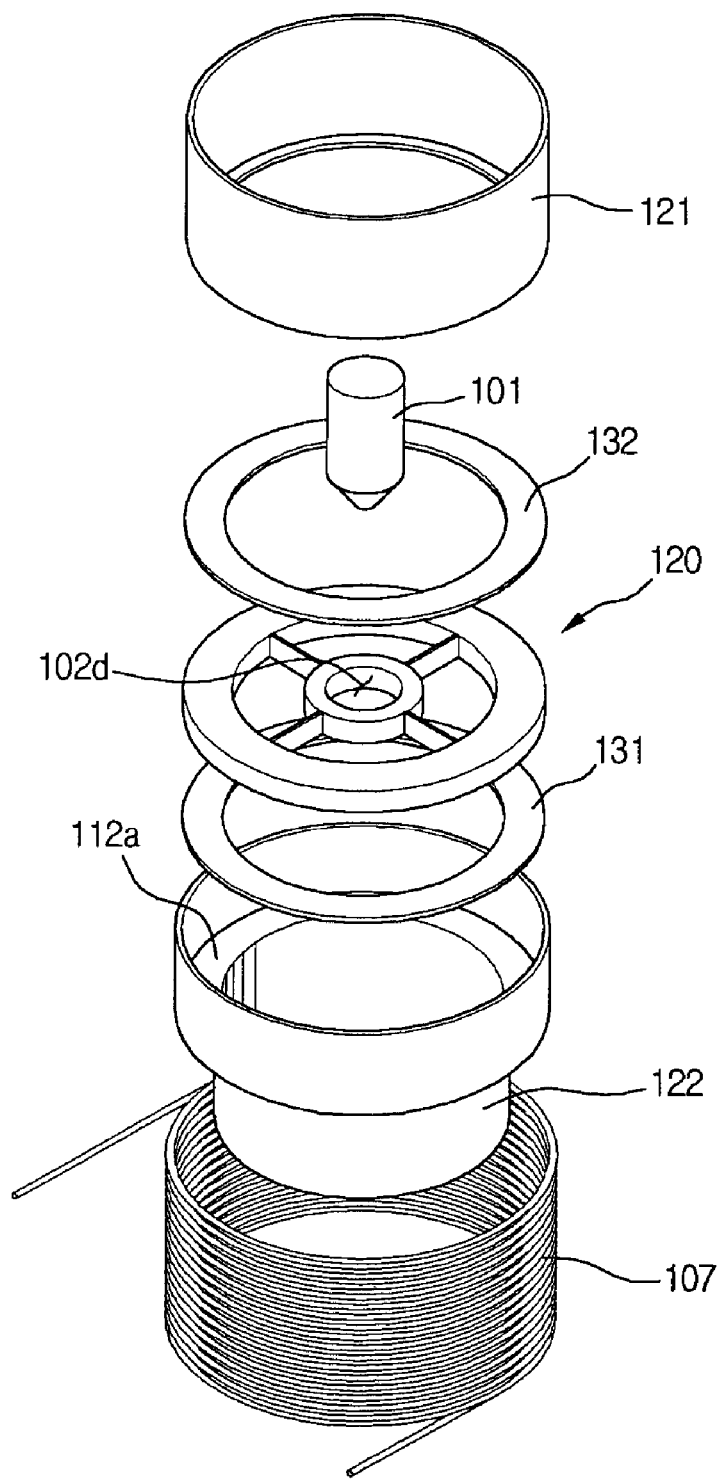
FIG. 3 is an exploded perspective view of the flow control valve apparatus shown in FIG. 1.

The flow 120 channel is configured to include an upper flow channel 121 and a lower flow channel 122. It is preferable that the lower flow channel 122 is manufactured to have a diameter that is less than that of the upper flow channel 121. The lower flow channel 122 may have a mounting part (see 112a of FIG. 3) on which the upper flow channel 121 is mounted. When the upper flow channel 121 is mounted on the mounting part of the lower flow channel 122, an outer circumference of the upper flow channel 121 is sealingly bonded to a surface of the lower flow channel 122 facing the outer circumference of the upper flow channel 122.

The sealing piece 108 is installed in a plane perpendicular to a longitudinal axial direction of the flow channel 120 at a predetermined position of the lower flow channel 122, and has the orifice 105 through which fluid passes. In other words, the sealing piece 108 is preferably attached to the lower flow channel 122 along the inner circumference of the lower flow channel 122. That is, the diameter of the orifice 105 is less than the thickness of the sealing piece 108. This is because when a high pressure fluid passes through the orifice 105, temperature and density of the fluid are sharply lowered due to the adiabatic expansion principle so that the high pressure fluid can be vaporized to a particle state. Accordingly, the inventive flow control valve apparatus may be used even as a linear expansion valve by using the adiabatic expansion principle.

The permanent magnet valve member 101, when magnetized, has a magnetic dipole moment in a predetermined direction. Although the present invention is described under an assumption that the magnetic dipole moment is formed from the direction of the lower flow channel 122 to the direction of the upper flow channel 121, the magnetic dipole moment may be formed in any other directions. As an example, the permanent magnet valve member 101 is formed in the shape of a cylinder of which one end is tapered and, due to the tapered shape, the orifice 105 can be opened or closed.

The permanent magnet valve member 101 can be manufactured by melting a rare earth magnetic material, molding the melted magnetic material by using a mold, and grinding the surface of the molded semi-product. Alternatively, the permanent magnet valve member 101 may be manufactured by machining a cylindrical rod shaped magnetic material such that one end thereof is tapered by a rotation lathe machining, precisely machining an outer dimension of the machined magnetic material, aligning and assembling the machined magnetic material with a through hole 102d of the supporting member 102, and then applying a magnetic field in an axial direction thereof to magnetize the machined magnetic material.

The supporting member 102 is used to suspend the permanent magnet valve member 101, and is configured to include a fixing part 102c, an elastic flexure 102a, and a hub 102b. As an example, the fixing part 102c, the elastic flexure 102a and the hub are preferably made of an identical material. The hub 102b has the through hole 102d into which the permanent magnet valve member 101 is inserted and fixed. The elastic flexure 102a functions as a spring, which supports the hub 102b and provides a restoring force in an opposite direction to the displacement in proportion to the displacement of the permanent magnet valve member 101. One end of the elastic flexure 102 is connected to the hub 102b and the other end is connected to the fixing part 102c. One end of the fixing part 102c is fixed to the flow channel 120, and more exactly, to an inner surface of the lower flow channel 122, and the other end is connected to the elastic flexure 102a, to thereby support the hub 102b via the elastic flexure 102a.

Here, to prevent fluid from being leaked between the upper flow channel 121 and the lower flow channel 122, a first gasket 131 is mounted on and fixed to the mounting part 112a of the lower flow channel 122, a second gasket 132 is mounted on the fixing part 102c, and the upper flow channel 121 is mounted on the second gasket 132. In other words, the first and second gaskets 131 and 132 are used for preventing fluid from being leaked to upper and lower sides of the fixing part 102c.

The solenoid coil 107 may be a bundle type coil installed along an outer circumference of the flow channel 120 such that the permanent magnet valve member 101 can open or close the orifice 105. As an example, the solenoid coil 107 is preferably covered with a yoke housing 109 such that magnetic flux induced by current flowing through the solenoid coil 107 is generated as much as possible inside the flow channel 120.

Also, at least one solenoid coil can be installed on an outer surface of the flow channel 120. For example, in case where one solenoid coil is used, the solenoid coil can be installed on the outer circumference of the flow channel 120 corresponding to the position of the supporting member 102. If two solenoid coils are used, they can be installed on the outer circumference of the flow channel 120 corresponding to upper and lower positions of the supporting member 102.

A fluid flowing through the flow channel 120 may be selected from the group consisting of gaseous state, liquid state, and super critical state where a gaseous state and a liquid state are mixed.

Figure 4A:
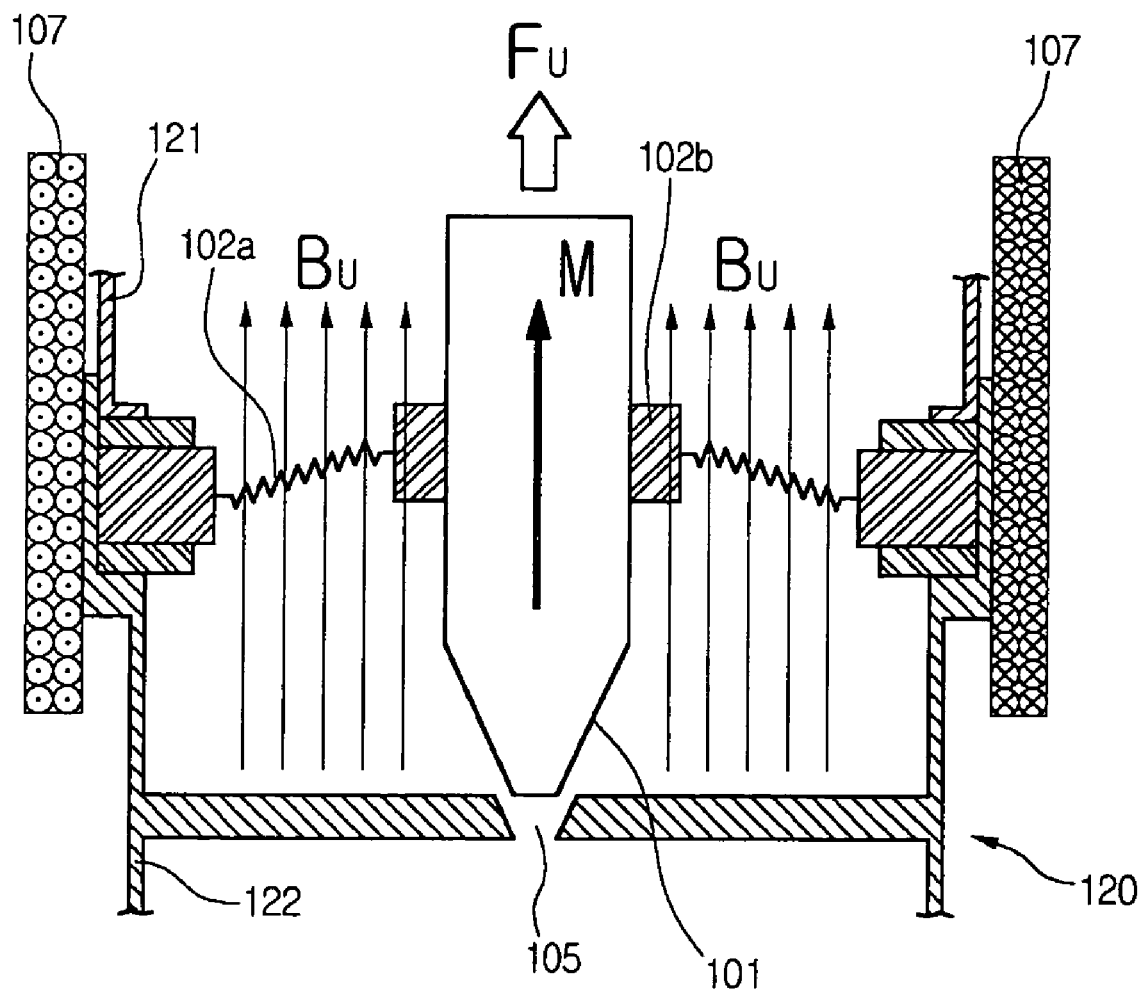
FIGS. 4A and 4B are schematic views illustrating a principle of operation of a flow control valve provided with a single coil according to a preferred embodiment.
Figure 4B:
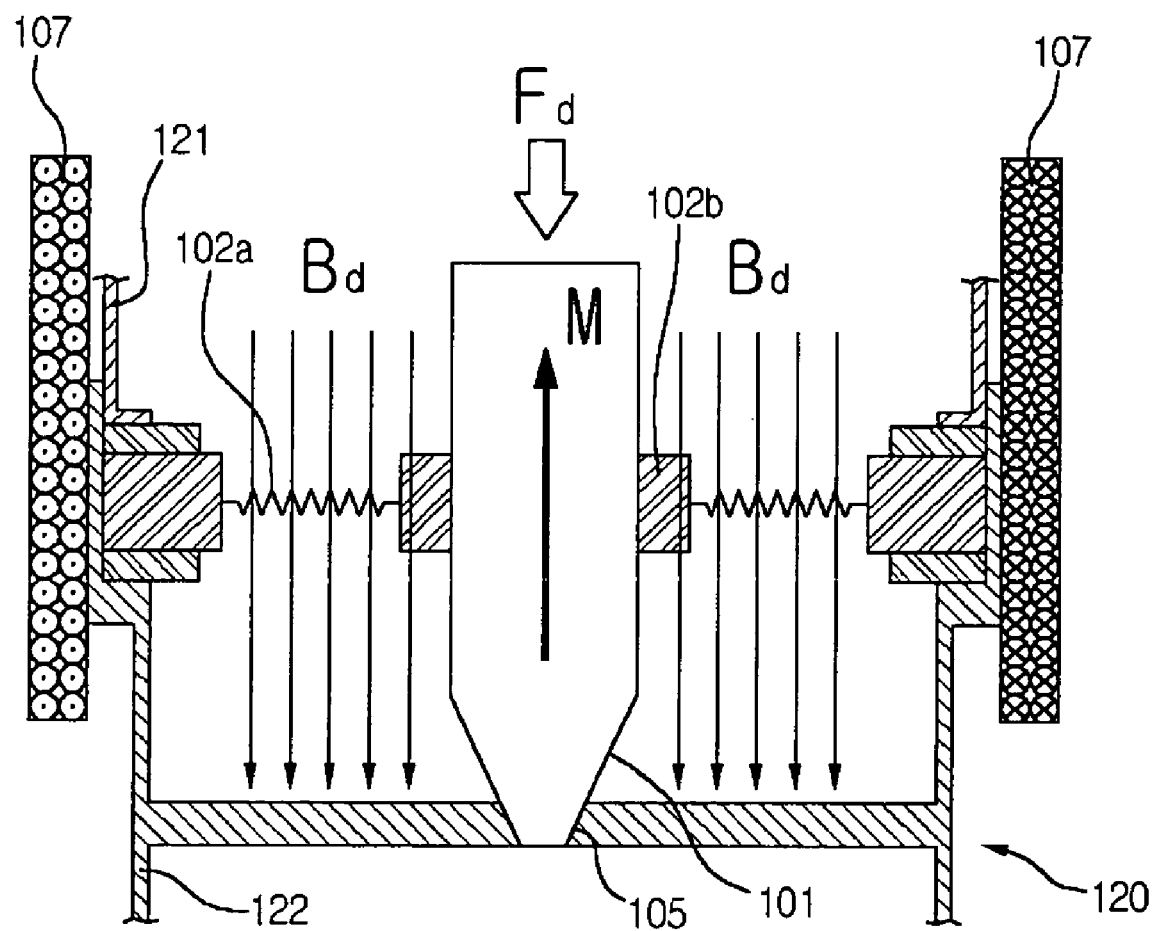

FIGS. 4A and 4B are schematic views illustrating a principle of operation of a flow control valve provided with a single coil according to a preferred embodiment. Specifically, FIG. 4A shows that the orifice is opened and FIG. 4B shows that the orifice is closed. A center point of the permanent magnet valve member 101 may be positioned at an upper side or a lower side of a center point of the solenoid coil 107 such that the permanent magnet valve member 101 is moved from the orifice 105. In case of FIGS. 4A and 4B, it is assumed that the center point of the permanent magnet valve member 101 is positioned lower than the center point of the solenoid coil 107, the permanent magnet valve member 101 is magnetized in an upper direction along an axis of the flow channel 120, and the intensity of magnetization of the permanent magnet valve member 101 is M.

As shown in FIG. 4A, if the current flowing through the coil 107 installed on the outer circumference of the flow channel 120 is applied in a clockwise direction centered on the center axis of the flow channel 120, a magnetic flux density Bu having an upper direction is induced inside the flow channel 120 by magnetic induction law. At this time, the magnetic flux density is proportional to the intensity of current applied to the coil 107. In other words, if the intensity of the current is small, the magnetic flux density becomes small. To the contrary, if the intensity of the current is increased, the magnetic flux density increases too.

At this time, the permanent magnet valve member 101 is magnetized in an upper direction and the magnetic flux density is also induced in the upper direction, both ends of the permanent magnet valve member 101 are subject to a repulsive force. However, because the center point of the permanent magnet valve member 101 is positioned lower than the center point of the solenoid coil 107, a more repulsive force acts on the lower end of the permanent magnet valve member 101 compared with the upper end of the permanent magnet valve member 101, so that the permanent magnet valve member 101 is subject to a driving force Fu in the upper direction, is moved in the upper direction, and accordingly the orifice 105 is opened.

In the meanwhile, as the permanent magnet valve member 101 is moved, the hub 102b of the supporting member and the elastic flexure 102a are moved together with the permanent magnet valve member 101, so that a flexural deformation is caused and a restoring force that is in proportional to the deformation acts in an opposite direction (i.e., direction toward the orifice 105) to the moving direction of the permanent magnet valve member 101. At this time, the restoring force increases in proportional to the displacement of the permanent magnet valve member 101. Also, if fluid flows as the orifice is opened, a pressure drop is generated in the moving direction of the fluid, so that a predetermined force is applied in an opposite direction to the moving direction of the permanent magnet valve member 101.

Accordingly, the displacement of the permanent magnet valve member 101 is determined as a point where the driving force Fu by the induced magnetic field, the restoring force by the elastic flexure 102a, and a force by the pressure drop of the fluid are balanced. Finally, the displacement of the permanent magnet valve member 101 is generated with a value such that the restoring force by the elastic flexure 102a and the force by the pressure drop of the fluid are subtracted from the driving force by the induced magnetic field. Accordingly, because the restoring force by the elastic flexure 102a and the force by the pressure drop of the fluid are fixed values, the degree of displacement of the permanent magnet valve member 101 is determined by the driving force of the induced magnetic field. Also, because the driving force by the induced magnetic field is proportional to the intensity of the current applied to the solenoid coil 107, the displacement of the permanent magnet valve member 101 can be arbitrarily varied by adjusting the intensity of the current. Further, if the displacement of the permanent magnet valve member 101 is varied, the effective area of the orifice through which the fluid passes is also adjusted, thereby permitting control of a desired flow amount freely.

As shown in FIG. 4B, if the current flowing through the coil 107 installed on the outer circumference of the flow channel 120 is applied in the clockwise direction centered on the center axis of the flow channel 120, a magnetic flux density Bd having a lower direction is generated inside the flow channel 120 by magnetic induction law.

At this time, the permanent magnet valve member 101 is magnetized in the upper direction and the magnetic flux density is induced in the lower direction, so that both ends of the permanent magnet valve member 101 are subject to an attractive force. However, since the center point of the permanent magnet valve member 101 is positioned lower than the center point of the coil 107, a more attractive force acts on the lower end of the permanent magnet valve member 101 compared with the upper end of the permanent magnet valve member 101, so that the permanent magnet valve member 101 is subject to the driving force Fd in the lower direction, is moved in the lower direction, and accordingly, the orifice 105 is closed.

Even in the above case, the restoring force of the elastic flexure 102a applies a restoring force acting in an opposite direction in the moving direction of the permanent magnet valve member 101, to the permanent magnet valve member 101, so that the force, which is due to the pressure drop of the fluid inside the flow channel 120, is also applied to the permanent magnet valve member 101.

At this time, the degree of movement of the permanent magnet valve member 101 toward the lower direction is determined depending on the intensity of the current applied to the solenoid coil 107.

In the meanwhile, by sufficiently increasing the pressure of the fluid injected into the flow channel 120, the permanent magnet valve member 101 may close the orifice 105 due to the sufficiently high fluid pressure although an initial current is not applied. However, even in the above case, by gradually decreasing the intensity of the current applied to the solenoid coil 107 such that the permanent magnet valve member 101 gradually closes the orifice 105, the possibility of fracture of the permanent magnet valve member 101 and noise generation that may be caused by abrupt collision of the permanent magnet valve member 101 with the orifice 105, can be preferably prevented.

Figure 5A:
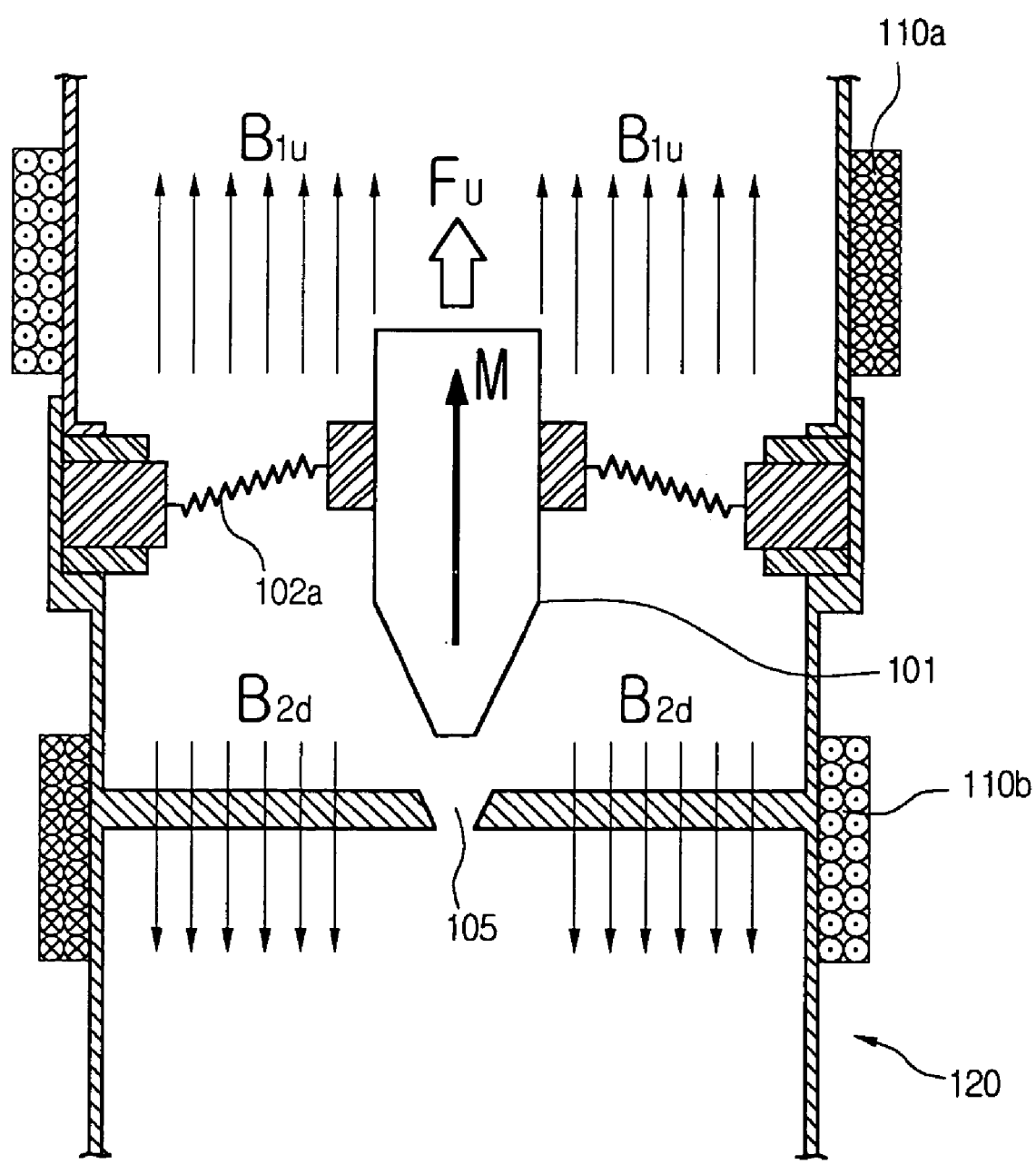
FIGS. 5A and 5B are schematic views illustrating a principle of operation of a flow control valve provided with two coils according to a preferred embodiment.
Figure 5B:
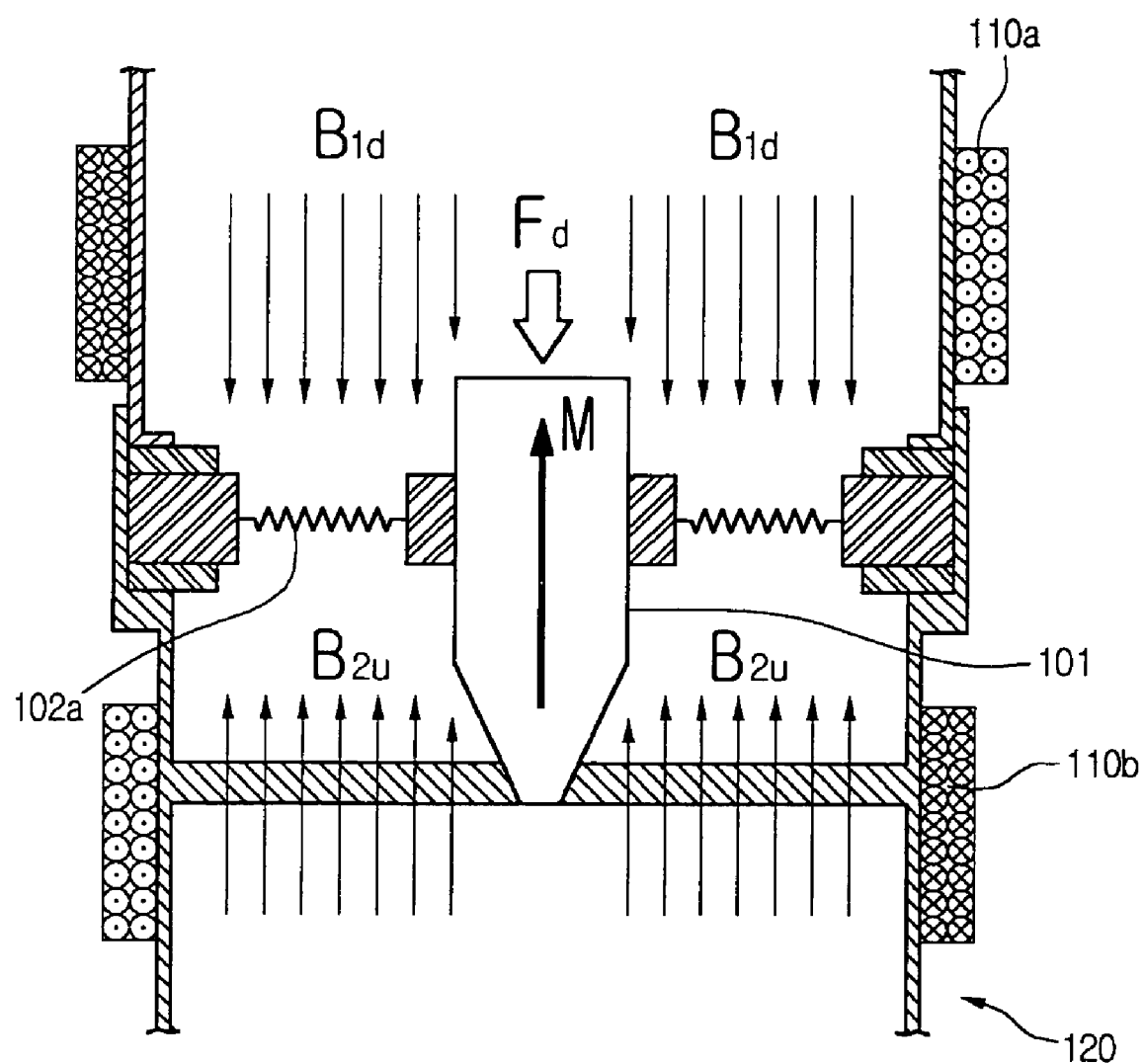

FIGS. 5A and 5B are schematic views illustrating a principle of operation of a flow control valve provided with two coils according to a preferred embodiment. Specifically, FIG. 5A shows that the orifice is opened and FIG. 5B shows that the orifice is closed. In FIGS. 5A and 5B, it is assumed that the permanent magnet valve member 101 is magnetized in the upper direction along the axis of the flow channel 120 and the intensity of magnetization of the permanent magnet valve member 101 is M.

Thus, if two solenoid coils 110a and 110b are installed, the linearity and stability of the driving force can be further enhanced.

The construction of the flow control valve apparatus shown in FIGS. 5A and 5B is the same as that of the flow control valve apparatus using the single solenoid coil shown in FIGS. 4A and 4B. They are different only in that two solenoid coils 110a and 110b in the FIGS. 5A and 5B are respectively installed on the outer circumference of the flow channel corresponding to the upper and lower positions of the supporting member 102.

At this time, it is desirable that the positions of the solenoid coils 110a and 110b are designed such that the driving force due to the induced magnetic field of the permanent magnet valve member 101 positioned on the central axis of the flow channel 120 is maximized.

As shown in FIG. 5A, a clockwise current is applied to the upper solenoid coil 110a while a counterclockwise current is applied to the lower solenoid coil 110b.

First, a magnetic flux density B1u is induced in the upper direction by the current applied to a upper solenoid coil 110a, and the intensity of the magnetic flux density B1u can be increased in proportional to the intensity of the current applied to the upper solenoid coil 110a. Accordingly, the driving force of the upper direction is exerted on the permanent magnet valve member 101 by a repulsive force between the magnetic flux density B1u and a magnetic pole formed in the permanent magnet valve member 101.

Also, if a magnetic flux density B2d is induced by a current applied to the lower solenoid coil 110b, the intensity of the magnetic flux density B2d can be increased in proportion to the intensity of the current applied to the lower solenoid coil 110b. Accordingly, the driving force in the upper direction is exerted on the permanent magnet valve member 101 by an attractive force between the magnetic flux density B2d and a magnetic pole formed in the permanent magnet valve member 101. In other words, because the lower solenoid coil 110b is positioned lower than the permanent magnet valve member 101 by a predetermined distance, the attractive force at the upper end of the permanent magnet valve member 101 is greater than that at the lower end of the permanent magnet valve member 101, so that the permanent magnet valve member 101 is subject to the driving force in a direction having a more repulsive force, i.e., in the upper direction.

Accordingly, the driving force in the upper direction by the lower solenoid coil 110b is summed with the driving force in the upper direction by the upper solenoid coil 110a to form a sum driving force Fu, and the sum driving force Fu allows the permanent magnet valve member 101 to be moved in the upper direction with more driving force.

As when using the single solenoid coil, the displacement of the permanent magnet valve member 101 is determined at a point where the driving force Fu by the induced magnetic field, the restoring force by the elastic flexure 102a, and a force by the pressure drop of the fluid are balanced.

As shown in FIG. 5B, a clockwise current is applied to the upper solenoid coil 110a while a counterclockwise current is applied to the lower solenoid coil 110b.

When a magnetic flux density B1d is induced in the lower direction by a current applied to the upper solenoid coil 110a, the intensity of the magnetic flux density B1d can be increased in proportional to the intensity of the current applied to the upper solenoid coil 110a. Accordingly, a driving force in the lower direction is exerted on the permanent magnet valve member 101 by an attractive force between the magnetic flux density B1d and a magnetic pole formed in the permanent magnet valve member 101.

Also, if a magnetic flux density B2u is induced by a current applied to the lower solenoid coil 110b, the intensity of the magnetic flux density B2u can be increased in proportion to the intensity of the current applied to the lower solenoid coil 110b. Accordingly, the driving force in the lower direction is exerted on the permanent magnet valve member 101 by a repulsive force between the magnetic flux density B2u and a magnetic pole formed in the permanent magnet valve member 101.

Accordingly, the driving force in the lower direction by the lower solenoid coil 110b is summed with the driving force in the lower direction by the upper solenoid coil 110a to form a sum driving force Fd, and the sum driving force Fd allows the permanent magnet valve member 101 to be moved in the lower direction with more driving force.

As when using the single solenoid coil, the displacement of the permanent magnet valve member 101 is determined at a point where the driving force Fu by the induced magnetic field, the restoring force by the elastic flexure 102a, and a force by the pressure drop of the fluid are balanced.

FIGS. 6A to 6G are views for illustrating a manufacturing method of a supporting member 302 used for suspending a permanent magnet valve member in a flow control valve apparatus according to a preferred embodiment of the present invention. Specifically, the right-side figures of FIGS. 6A to 6G are perspective views of processed shapes, and the left-side figures are sectional views taken along the imaginary line A–B. Although only one supporting member 302 is shown in the figures of FIGS. 6A to 6G for convenience, two or more supporting members 302 can be mass-produced in an actual manufacturing process from a substrate in a wafer state.

Accordingly, the supporting member 302 comprised of a fixing part 302c, an elastic flexure 302a and a hub 302b can be mass-produced by using the silicon micromachining technology and the semiconductor batch manufacturing process.

Figure 6A:
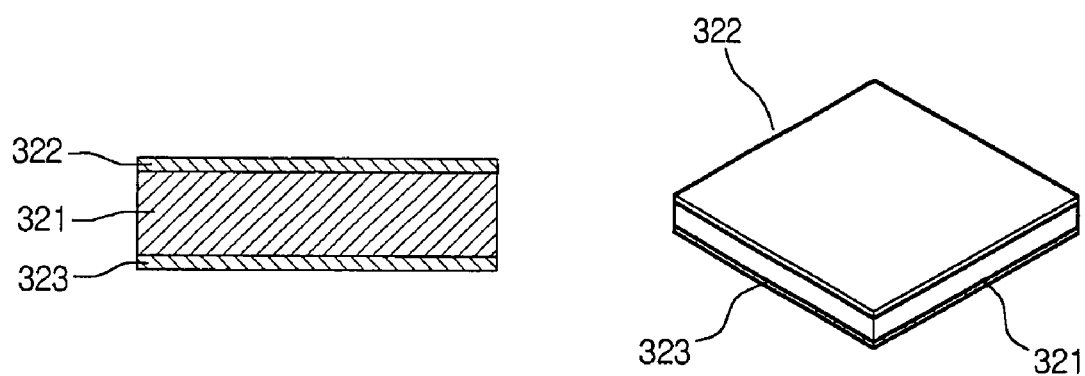
FIGS. 6A to 6G are views for illustrating a manufacturing method of a supporting member used for suspending a permanent magnet valve member in a flow control valve apparatus according to a preferred embodiment of the present invention.

First, thin films 322 and 323 for an etch mask are formed on a wafer type silicon substrate 321 (FIG. 6A).

At this time, it is desirable that the thin films 322 and 323 for the etch mask are made of a material having a high etch selectivity with respect to the silicon substrate 321 according to an etch method of the silicon substrate and a chemical used for an etch reaction. In other words, the thin films 322 and 323 for the etch mask can be made of one of various metal materials such as aluminum, chromium, gold and the like. Also, the thin films 322 and 323 for the etch mask can be formed on the silicon substrate 321 by using one of a coating process, deposition process and electroplating process.

Figure 6B:
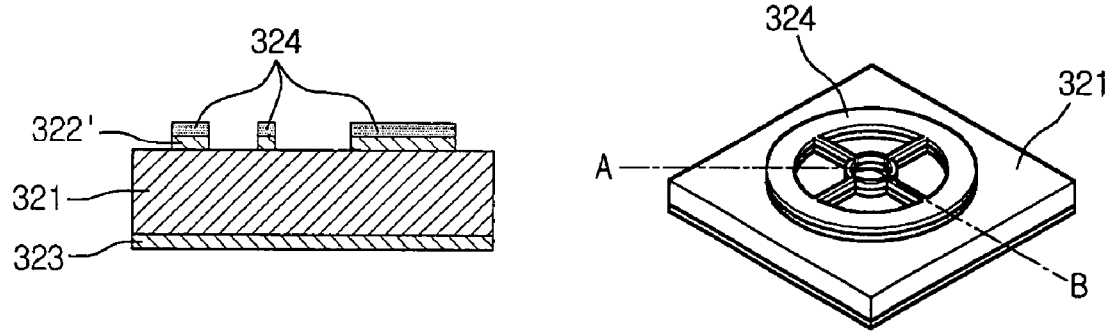

Next, an upper photoresist film 324 is coated on the thin film 322 for the etch mask formed on an upper surface of the silicon substrate 321, and is then patterned by using a photolithography technology. Thereafter, the thin film 322 exposed between the upper photoresist patterns is selectively etched, and the upper photoresist pattern is stripped, so that an upper etch mask pattern 322', which is being used to etch the upper surface of the silicon substrate 321, is formed (FIG. 6B).

Herein, the upper etch mask pattern 322' is used for the fixing part, the elastic flexure and the hub constituting the supporting member 302.

Figure 6C:
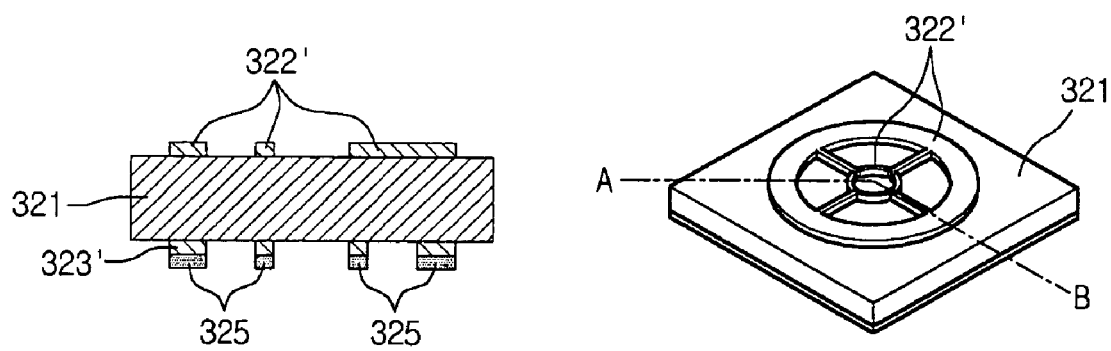

Next, a lower photoresist film 325 is coated on the thin film 323 for the etch mask formed on a lower surface of the silicon substrate 321, and is then patterned by using a double side alignment photolithography technique so as to be aligned with the upper etch mask pattern 322'. Thereafter, the thin film 323 for the lower etch mask exposed between the lower photoresist patterns 325 is selectively etched, and the lower photoresist pattern 325 is then stripped, so that a lower etch mask pattern 323', which is used to etch a lower surface of the silicon substrate 321, is formed (FIG. 6C).

Figure 6D:
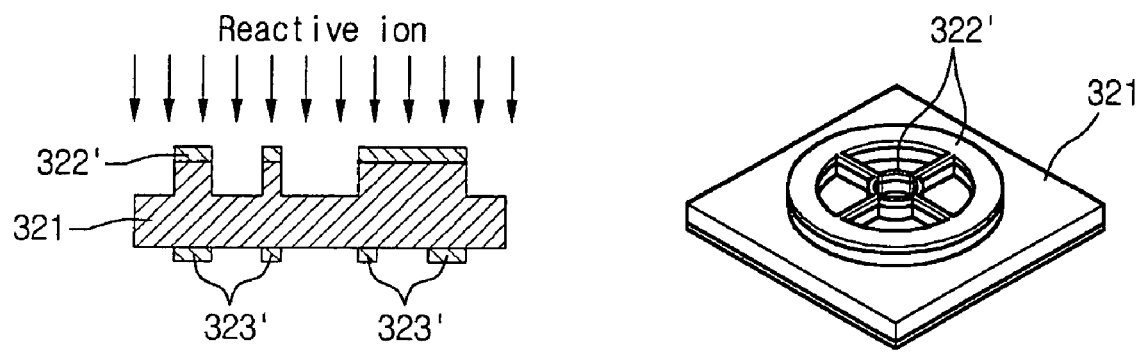

Next, the silicon substrate 321 exposed between the upper etch mask patterns 322' and is etched to a predetermined depth by using a reactive ion etching (RIE) technique enabling an anisotropic etching (FIG. 6D).

Figure 6E:
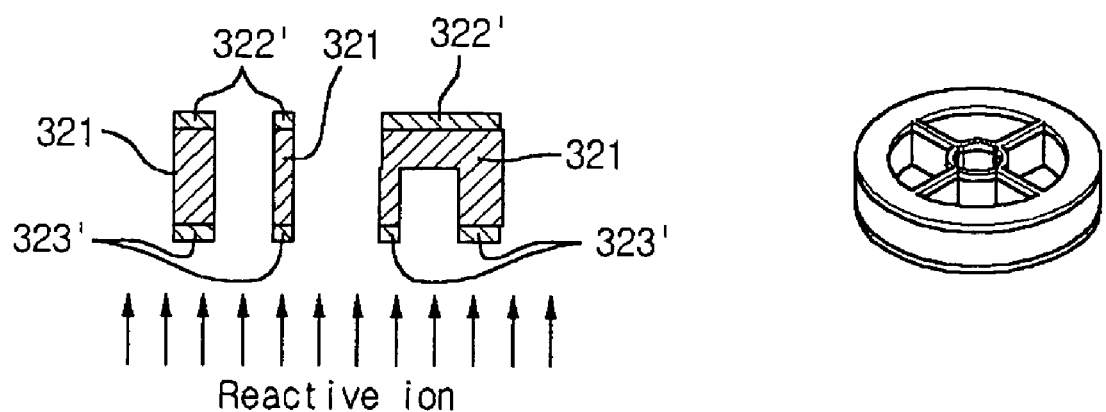

Next, as shown in FIG. 6E, the silicon substrate 321 exposed between the lower etch mask patterns 323' is etched to a predetermined depth by using a reactive ion etching (RIE) technique enabling an anisotropic etching.

As shown in FIGS. 6D and 6E, the thickness and the spring constant of the through hole into which the permanent magnet valve member 101 is inserted are respectively determined by the etching of the upper and lower etch mask patterns 322' and 323'.

Figure 6F:
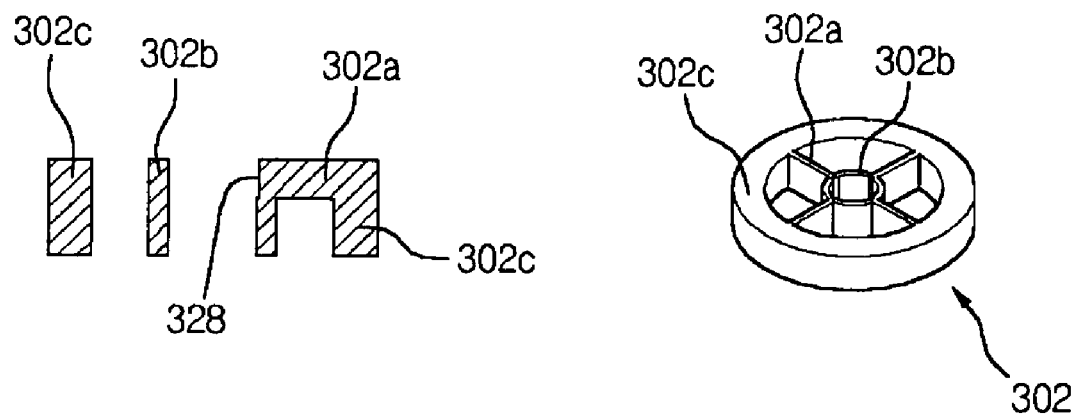

By removing the upper and lower etch mask patterns 322' and 323', the supporting member 302 comprised of the hub 302b having the through hole through which the permanent magnet valve member 101 is inserted, the elastic flexure 302a, and the fixing part 302c, is completed (FIG. 6F).

Figure 6G:
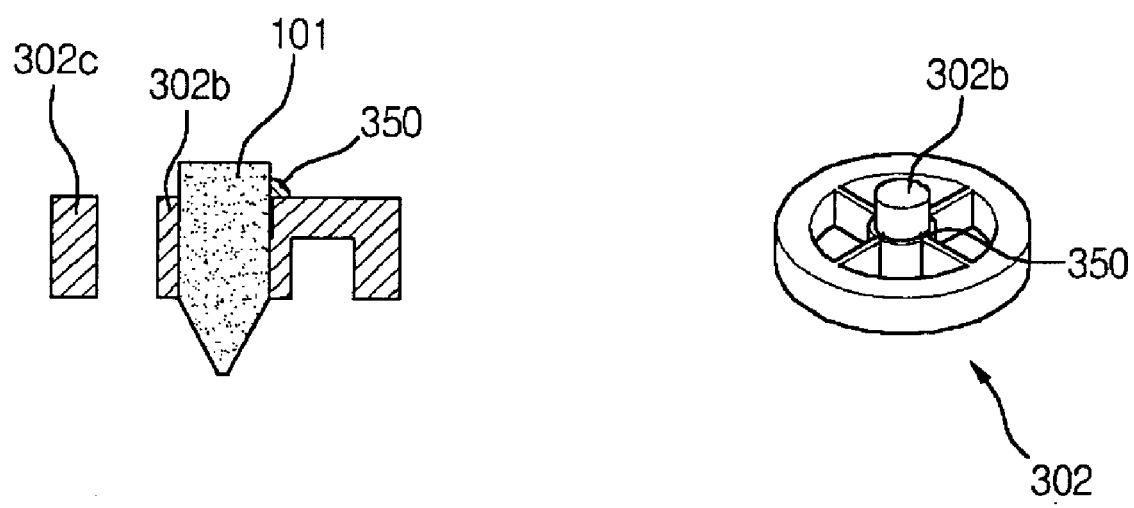

As shown in FIG. 6G, after the permanent magnet valve member 101 is inserted into the through hole, an adhesive 350 is coated on an assembly surface, and the supporting member and the permanent magnet valve member 101 are coupled to each other. Thus, the supporting member 302 and the permanent magnet valve member 101 are manufactured in a single part (i.e., opening/closing means), and are installed in a flow channel 120 to complete the flow control valve apparatus 100.

Reviewing the manufacturing method of the flow control valve apparatus, the first gasket is first mounted on the mounting part of the prepared lower flow channel. The opening/closing means prepared as above is mounted on the first gasket and at the same time is hermetically sealed to the inner circumference of the lower flow channel. After that, the second gasket is mounted on the opening/closing means. Thereafter, the upper flow channel is mounted on the second gasket and at the same time is hermetically sealed with the lower flow channel by a welding or the like. At this time, in case where the connection portion of the upper flow channel and the lower flow channel is screw-machined, they may be sealed by a screw coupling.

After that, one or more coils are installed at predetermined positions along the outer circumference of the flow channel comprised of the upper flow channel and the lower flow channel, so that the flow control valve apparatus is completed.

Figure 7:
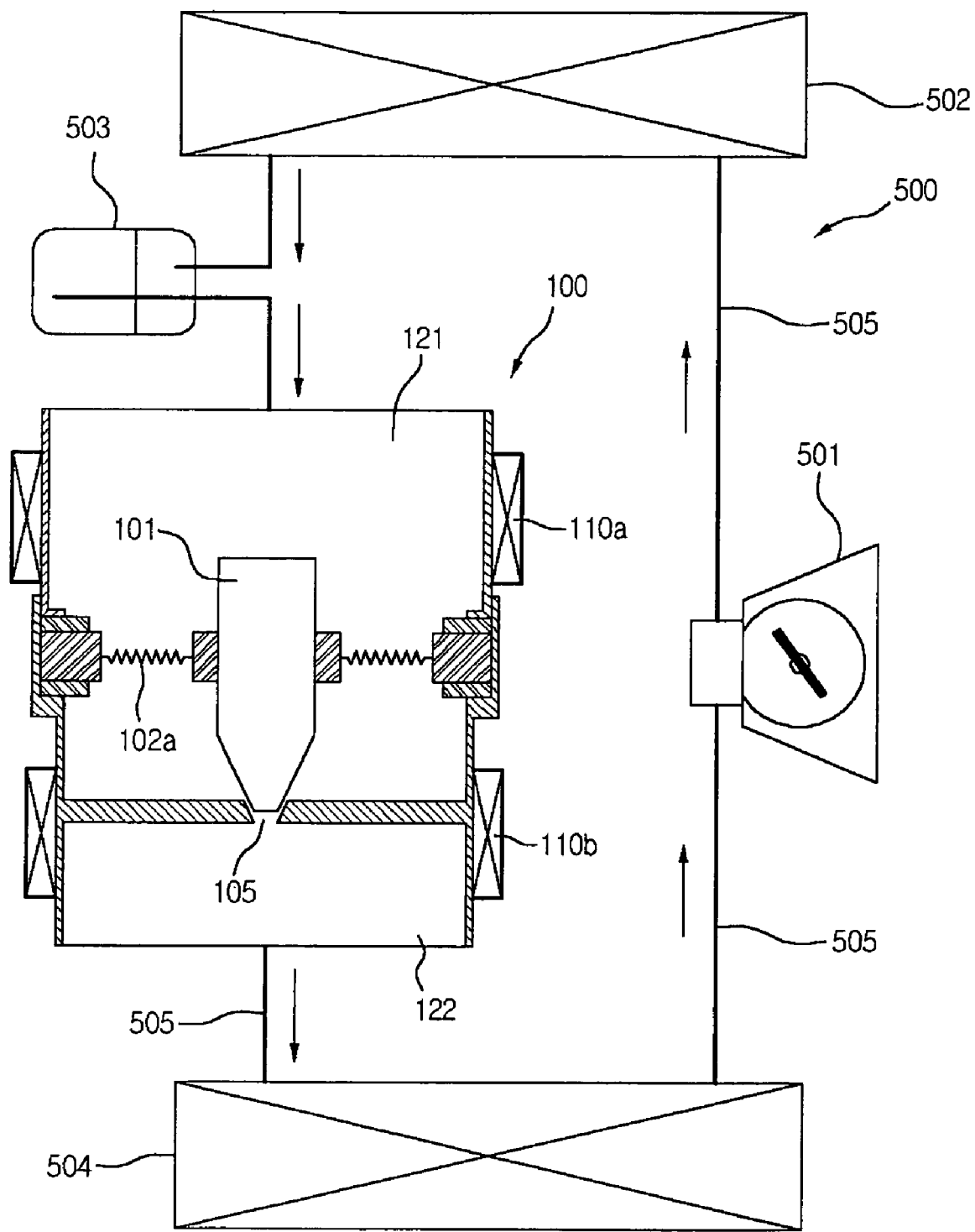
FIG. 7 is a schematic view of a heat exchanger provided with a flow control valve apparatus according to a preferred embodiment of the present invention.

FIG. 7 is a schematic view of a heat exchanger provided with a flow control valve apparatus 100 according to a preferred embodiment of the present invention. In FIG. 7, there are shown two coils wound on the outer circumference of the flow channel 120 of the flow control valve apparatus 100. However, only one coil may be wound on the outer circumference of the flow channel 120.

Describing the operation of the heat exchanger 500 with reference to FIG. 7, a refrigerant in a gas state compressed in a compressor 501 flows into a condenser 502 through a pipe 505, and is liquefied in the condenser 502. At this time, latent heat generated from the refrigerant is radiated to an external environment through the condenser 502.

The refrigerant liquefied in the condenser 502 is injected into a flow control valve apparatus 100 that can be used as an expansion valve, via a receiver 503. Although not shown in FIG. 7, the receiver 503 may include a filter for filtering particles mixed in or generated from the refrigerant, and a drier for removing an impurity component such as moisture mixedly introduced into the refrigerant.

The refrigerant injected into an upper flow channel 121 of the flow control valve apparatus 100 flows into a lower flow channel 122 through an orifice 105 according to a displacement of the permanent magnet valve member 101. At this time, the displacement of the permanent magnet valve member 101 is adjustable depending on a current applied to solenoid coils 110a and 110b installed along the respective outer circumferences of the upper flow channel 121 and the lower flow channel 122. The refrigerant injected into the upper flow channel 121, which is in a high pressure, flows into the lower flow channel 122 in a low pressure through the narrow orifice 105, so that the refrigerant is abruptly lowered in temperature due to the adiabatic expansion principle of fluid and atomized in a particle state having a low density. This adiabatic expansion action allows the displacement of the permanent magnet valve member 101 to be linearly adjustable, thereby provides a function capable of linearly controlling the displacement of the permanent magnet valve member 101.

The refrigerant atomized by the adiabatic expansion is moved to an evaporator 504 connected to the lower flow channel 122. The evaporator 504 vaporizes the refrigerant by using heat taken away from an environment around the evaporator 504, thereby performing the cooling function.

The refrigerant vaporized in the evaporator 504 again enters into the compressor 501 through the pipe 505, thereby completing a fluidic circuit in which the aforementioned steps are repeatedly performed.

By controlling this circulation cycle by using the inventive flow control valve apparatus, the cooling efficiency can be controlled easily.

As described previously, since the inventive flow control valve apparatus 100 is small in the number of the constituent parts, and easy in the machining and assembly, a low price and a miniaturization can be realized.

In particular, since the displacement of the permanent magnet valve member 101 is linearly adjustable depending on the intensity of the current applied to the coil, the opened area of the orifice 105 is also adjustable linearly, the flow control valve apparatus 100 can be used as a linear expansion valve or as an opening/closing valve, which is opened or closed depending on the current applied to the coil.

Also, according to the present invention, because the supporting member for suspending the permanent magnet valve member 101 can be mass-produced precisely at a low price, it is possible to mass-produce the valve apparatus 100 having a uniform function at a lower price.

Further, by applying the inventive flow control valve apparatus to the heat exchanger as a linear expansion valve, air-conditioning or cooling efficiency can be adjusted easily, and the heat exchanger can be miniaturized at an inexpensive price.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A flow control valve apparatus comprising:
    a flow channel having a longitudinal axis comprising an upper flow channel and a lower flow channel, for guiding a fluid;
    sealing means installed in a plane perpendicular to the flow channel to close the flow channel, the sealing means having therein an orifice through which the fluid is allowed to be passed conditionally;
    opening/closing means for opening/closing of the orifice, the opening/closing means including permanent magnet valve member for opening/closing the orifice of the sealing means and supporting member having an elastic flexure supporting the permanent magnet valve member for providing an elastic restoring force in an opposite direction to displacement of the permanent magnet valve member; and
    applying means installed along an outer circumference of the flow channel, for providing an driving force to the valve member in order to open/close the orifice when a current is applied thereto.

2. The flow control valve apparatus of claim 1, wherein the sealing means is attached along an inner circumference of the lower flow channel.

3. The flow control valve apparatus of claim 1, wherein when the permanent magnet valve member is magnetized, a magnetic dipole moment is generated in a predetermined direction.

4. The flow control valve apparatus of claim 1, wherein the permanent magnet valve member has a displacement that is linearly variable in proportion to intensity of current applied to the applying means.

5. The flow control valve apparatus of claim 1, wherein the permanent magnet valve member is shaped as a cylinder of which one end is tapered.

6. The flow control valve apparatus of claim 1, wherein the supporting means further comprises:
    a hub having a through hole which the permanent magnet valve member is insertable through and fixable to;
    a fixing part of which one end is fixed along an inner circumference of the lower flow channel and the other end is connected with the elastic flexure.

7. The flow control valve apparatus of claim 6, wherein the hub, the elastic flexure and the fixing part are of an identical material.

8. The flow control valve apparatus of claim 6, wherein the fixing part has upper and lower sides and a first gasket and a second gasket are inserted into the upper and lower sides of the fixing part so as to prevent the fluid from being lost, the lower flow channel is contacted with a surface of the first gasket, and the upper flow channel is contacted with a surface of the second gasket.

9. The flow control valve apparatus of claim 1, wherein the sealing means is formed to have a diameter that is larger than a diameter of the orifice.

10. The flow control valve apparatus of claim 1, wherein the applying means is a solenoid coil shaped in a bundle.

11. The flow control valve apparatus of claim 10, wherein the solenoid coil comprises one or more solenoid coils.

12. The flow control valve apparatus of claim 10, wherein the solenoid coil is covered with a yoke housing.

13. The flow control valve apparatus of claim 1, wherein the permanent magnet valve member is movable up and down depending on a current direction applied to the applying means.

14. A flow control valve apparatus comprising:
    a flow channel having a longitudinal axis comprised of an upper flow channel and a lower flow channel, for guiding a fluid;
    a sealing piece installed in a plane perpendicular to the flow channel and having an orifice through which the fluid passes;
    a permanent magnet valve member for opening/closing the orifice;
    a supporting member for suspending the permanent magnet valve member; and
    a solenoid coil installed along an outer circumference of the flow channel, for linearly varying a displacement of the permanent magnet valve member when a current is applied thereto,
    wherein the supporting member comprises:
    hub having through hole which the permanent magnet valve member is insertable through and fixable to;
    an elastic flexure supporting the permanent magnet valve member to provide an elastic restoring force in an opposite direction to displacement of the permanent magnet valve member; and
    a fixing part of which one end is fixed along an inner circumference of the lower flow channel and the other end is connected with the elastic flexure.

15. The flow control valve apparatus of claim 14, wherein the hub, the elastic flexure and the fixing part are of an identical material.

16. The flow control valve apparatus of claim 14, wherein the solenoid coil comprises one or more solenoid coils.

17. The flow control valve apparatus of claim 14, wherein the permanent magnet valve member is movable up and down depending on a current direction applied to the applying means.

18. A method for manufacturing a flow control valve apparatus, the method comprising:
    forming a supporting member comprised of a hub having a through hole, an elastic flexure and a fixing part by using an etch mask pattern patterned on upper and lower surfaces of a silicon substrate as an etch mask;
    inserting and fixing a permanent magnet valve member into the through hole;
    bonding the supporting member to which the permanent magnet valve member is fixed on an inner circumference of a flow channel having at least one inner circumference and at least one outer circumference; and
    installing at least one solenoid coil along an outer circumference of the flow channel.

19. The method of claim 18, wherein the hub, the elastic flexure and the fixing part are of an identical material.

20. A heat exchanger in which a refrigerant compressed in a compressor is liquefied in a condenser, injected into a valve, adiabatically expanded in the valve, vaporized and cooled in an evaporator, and the vaporized refrigerant is again injected into the compressor, thereby circulating a repetitive heat exchange cycle, wherein the valve comprises:
a flow channel having a longitudinal axis and which allows the refrigerant liquefied in the condenser to adiabatically expand and be output;
a sealing piece installed in a plane perpendicular to the longitudinal axis of the flow channel and having an orifice through which the refrigerant passes;
a permanent magnet valve member for opening/closing the orifice;
a supporting member for suspending the permanent magnet valve member; and
a solenoid coil installed along an outer circumference of the flow channel that has at least one outer circumference, to which a current for linearly varying a displacement of the permanent magnet valve member is applicable, wherein the supporting means comprises:
a hub having a through hole which the permanent magnet valve member is insertable through and fixable to;
an elastic flexure supporting the permanent magnet valve member to provide an elastic restoring force in an opposite direction to a displacement of the permanent magnet valve member; and
a fixing part of which one end is fixed along an inner circumference of the lower flow channel rind the other end is connected with the elastic flexure.

21. The heat exchanger of claim 20, wherein the displacement of the permanent magnet valve member is variable in proportion to an intensity of current applied to the solenoid coil, to control an amount of the refrigerant passing through the orifice.

22. The heat exchanger of claim 20, wherein the permanent magnet valve member opens/closes the orifice depending on a direction of the current applied to the solenoid coil.

* * * * *